No. 655,936. Patented Aug. 14, 1900.
E. F. MEYER.
WAGON BRAKE.
(Application filed Mar. 6, 1900.)

(No Model.)

WITNESSES:
Henry Krug
Russell M. Everett

INVENTOR
Ernst F. Meyer,
BY
Drake & Co.
ATTORNEYS

UNITED STATES PATENT OFFICE.

ERNST F. MEYER, OF WAVERLY PARK, NEW JERSEY.

WAGON-BRAKE.

SPECIFICATION forming part of Letters Patent No. 655,936, dated August 14, 1900.

Application filed March 6, 1900. Serial No. 7,469. (No model.)

*To all whom it may concern:*

Be it known that I, ERNST F. MEYER, a citizen of the United States, residing at Waverly Park, in the county of Essex and State of New Jersey, have invented certain new and useful Improvements in Wagon-Brakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide for spring-wagons, or wagons having the body mounted on springs, a brake which shall act upon the rear side of the wheels, to thus prevent additional strain being brought upon the wagon-springs by braking, to obtain a construction by which the rearward displacement of the wagon-wheels with respect to the brakes due to flexing of the wagon-springs under a heavy load shall be compensated for, and to secure other advantages and results, some of which may be referred to hereinafter in connection with the description of the working parts.

The invention consists in the improved wagon-brake and in the arrangements and combinations of parts of the same, all substantially as will be hereinafter set forth and finally embraced in the clauses of the claim.

Figure 1:
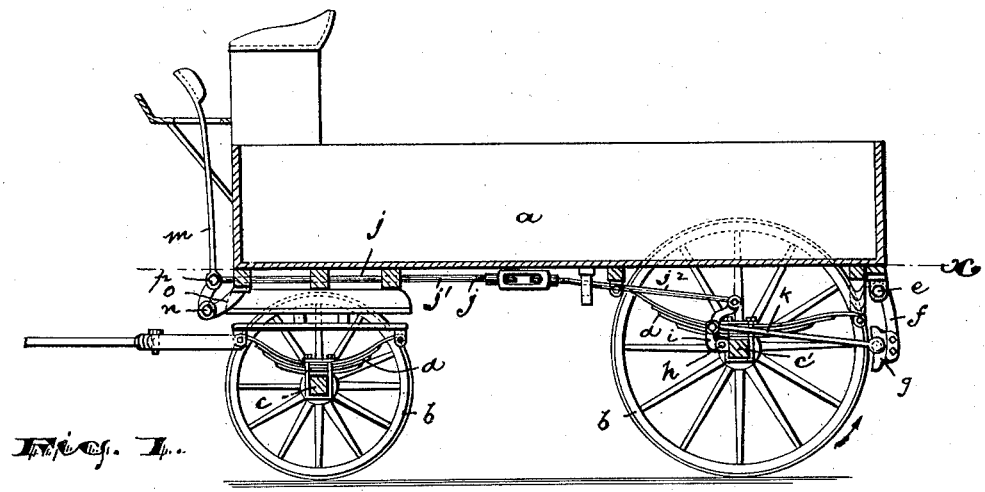
Figure 2:
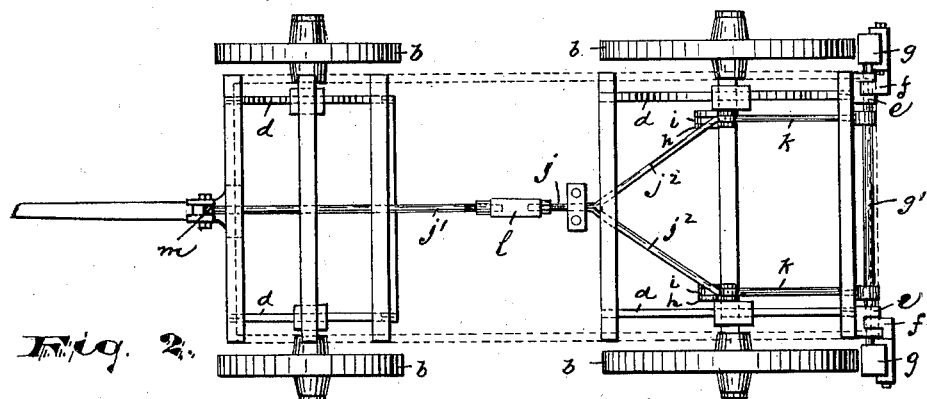
Figures 3, 4, 5, 6:
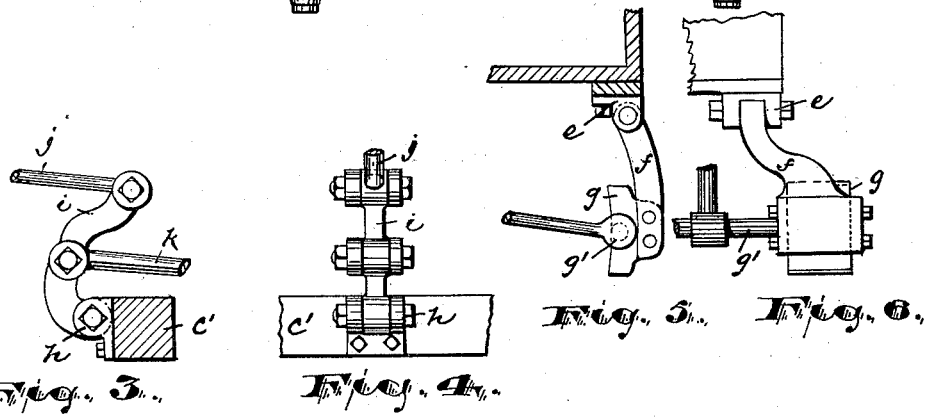

Referring to the accompanying drawings, in which like letters of reference indicate corresponding parts in each of the several views, Figure 1 is a vertical section of a vehicle to which my improved braking apparatus has been applied. Fig. 2 is a horizontal section of the same, taken at line $x$. Fig. 3 is a detailed view of a lever and connections adapted to be applied at the rear axle of the vehicle. Fig. 4 is a front view of the same. Fig. 5 is a side detail view of a braking-lever and connections adapted to be applied to the rear of the vehicle-body, and Fig. 6 is a rear view thereof.

In said drawings, $a$ indicates the body of the vehicle, $b\ b$ the wheels thereof, and $c\ c'$ the front and rear axles for said wheels. $d\ d$ represent the springs bearing on said axles and upon which springs the body of the vehicle is supported.

To the rear of the vehicle-body are fulcrumed, as at $e$, brake-shoe levers $f$, to the lower ends of which are attached the brake-shoes $g$, the said brake-shoes being adapted to press against the rear wheels $b$ and hold the same from turning. The brake-shoes $g$ are connected by the transverse rod $g'$ to hold said shoes in proper relation to the wheels. It will be understood that these brake-shoes are hung at the rear of the wagon, so that they are adjacent to the peripheries of the rear wheels at points to the rear of said wheels, and therefore the brake-shoes engage the peripheries of the wheels at points which are moving upward in normal forward movement of the vehicle. Thus when the brakes are set the friction of the wheel against the brake-shoe tends to lift said shoe and so exerts an upward pressure on the wagon-body which eases the weight of the load upon the springs of the wagon. The ordinary brake in common use at the front of the wheels of spring-wagons on the contrary adds the downward strain of the wheel scraping on the brake-shoe in braking to the load already upon the springs. It has been common to apply brakes to the rear of the wheels on skid-wagons or wagons having no springs between the body and axles; but in applying them to spring-wagons a difficulty has been experienced in that the relative displacement of body and wheels due to flexing of the springs disturbed the proper relation of wheels and brake-shoes for braking. Wagon-springs being usually made fast to the wagon-body at their front ends and movably secured thereto at their rear ends it will be understood that a heavy load would so depress the springs as to move the rear wheels backward enough to set them tight against the brakes if said brakes were at the rear of the wheels and were not thrown back further by hand away from the approaching wheels. By my improved construction I provide a compensating movement by which the brakes are automatically moved back from the wheels when the wagon-body is depressed, as will next be described.

To the rear axle $c'$ is fulcrumed, as at $h$, a lever $i$, which extends upward from said axle, and to the upper end thereof is pivoted a forwardly-extending forked connecting-rod $j$, the prongs $j^2$ of which diverge, as shown in Fig. 2, to couple with the connecting-rods disposed at opposite sides of the vehicle near the rear wheels. Between the fulcrums $h$ and the ends of the prongs of the connecting-rod $j$ the said levers $i$ have their connections with the rods $k$, the connections being so disposed as that when the said rod $j$ is thrown forward, as hereinafter described, the said rods $k$ will also move forward and draw the shoes $g$ into frictional contact with the wheel.

The rod $j$ is preferably in sections, which are adjustable in relation to one another by means of a turnbuckle $l$, and the forward section $j'$ of said rod $j$ is pivotally connected to a foot-lever $m$, fulcrumed at $n$ upon a bracket $o$, secured at the fore part of the vehicle-body $a$, the said connecting-rod $j$ being pivotally connected to the said lever $m$ at $p$, Fig. 1, so that when the said lever $m$ is pressed downward or forward by the foot the connecting-rod $j$ will also be thrown forward, and with it the levers $i$ and connecting-rod $k$, forcing the brake-shoes $g$ into contact with the wheels, as before indicated.

The rear section of the connecting-rod $j$ slants upwardly forward from the lever $i$ to the wagon-body $a$ or is inclined, and thus any depression of the springs such as lowers the body $a$ and forces the wheels $b$ rearward pushes the lever $i$ rearward, as will be understood from Fig. 1 of the drawings. This throws the brake-shoes rearward by an amount proportioned to the depression of the springs and prevents any engagement of the parts before the foot-lever $m$ is operated.

The parts are so disposed as that when the vehicle is moving forward and the rear wheels turning, as indicated by the arrow, Fig. 1, and the brake-shoes $g$ are pressing against the rear wheels $b$ the said rear wheels will tend to throw the said brake-shoes upward, so that the levers $f$ bear upward against the body $a$, thus relieving the rear springs $d$ of a portion of the weight of the said body, and under no circumstances will the brake operations add to the downward pressure upon the springs $d$, and thus when the vehicle is heavily loaded there will be no pressure added in connection with the breaking operation such as heretofore tended to unduly flex the springs and break the same.

Having thus described the invention, what I claim as new is—

1. In a vehicle, the combination of an axle and running wheels, a wagon-body and springs supporting said body upon said axle, brake-shoes hung at the rear of said running wheels, levers fulcrumed upon the axle, coupling-rods extending from the brake-shoes to said levers, a connecting-rod extending from said levers and means for applying draft to said rod, said rod having bearings upon the body of the vehicle and extending upward thereto from the levers on an incline, substantially as set forth.

2. In a vehicle, the combination with an axle, and running wheels, a body and springs supporting said body upon said axles, of a brake-shoe suspended from the body of the vehicle adjacent to the rear peripheral edge of a wheel, an upwardly and rearwardly inclined lever pivoted at or near its lower end upon the axle, a coupling-rod extending from said brake-shoe to a point of said lever intermediate of its ends, and a connecting-rod extending forwardly upward from the upper end of the lever and being jointed and its forward section having bearing on the vehicle-body, and means for applying draft to said rod, substantially as set forth.

In testimony that I claim the foregoing I have hereunto set my hand this 2d day of February, 1900.

ERNST F. MEYER.

Witnesses:
CHARLES H. PELL,
C. B. PITNEY.